US010514674B2

(12) United States Patent
Satou et al.

(10) Patent No.: US 10,514,674 B2
(45) Date of Patent: Dec. 24, 2019

(54) NUMERICAL CONTROLLER

(71) Applicant: FANUC CORPORATION, Minamitsuru-gun, Yamanashi (JP)

(72) Inventors: Takashi Satou, Yamanashi (JP); Takeshi Mochida, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/039,577

(22) Filed: Jul. 19, 2018

(65) Prior Publication Data

US 2019/0033817 A1 Jan. 31, 2019

(30) Foreign Application Priority Data

Jul. 26, 2017 (JP) .................................. 2017-144071

(51) Int. Cl.
*B21D 28/26* (2006.01)
*G05B 19/19* (2006.01)

(52) U.S. Cl.
CPC ............ *G05B 19/19* (2013.01); *B21D 28/26* (2013.01); *B21D 28/265* (2013.01); *G05B 2219/34083* (2013.01); *G05B 2219/45137* (2013.01)

(58) Field of Classification Search
CPC ............................. B21D 28/26; B21D 28/265
See application file for complete search history.

(56) References Cited

U.S. PATENT DOCUMENTS

| 5,931,070 A | 8/1999 | Miyajima et al. |
| 2008/0105098 A1* | 5/2008 | Barnes .................. B21D 28/26 83/345 |
| 2009/0145273 A1* | 6/2009 | Bressler ................ B21D 28/04 83/36 |
| 2017/0185073 A1 | 6/2017 | Hokazono et al. |

FOREIGN PATENT DOCUMENTS

| JP | 9-10858 A | 1/1997 |
| JP | H0938731 A | 2/1997 |
| JP | 2017117252 A | 6/2017 |

OTHER PUBLICATIONS

Japanese Office Action for Japanese Application No. 2017-144071, dated Mar. 5, 2019, 4 pages.

* cited by examiner

Primary Examiner — Mark A Connolly
(74) Attorney, Agent, or Firm — RatnerPrestia

(57) ABSTRACT

A numerical controller generates movement command data, and performs an interpolation process based on the generated movement command data to generate and output interpolation data. Further, in the case of a state in which a press operation in punch press machining is started from a different position from a position of a preset rising edge, an overlap time is calculated based on a position of a punch head when the press operation is started, and an output timing of interpolation data related to an axis controlling the press operation is controlled based on the calculated overlap time. In this way, even when there is a change in press stroke, a dead time may be prevented from being generated.

2 Claims, 9 Drawing Sheets

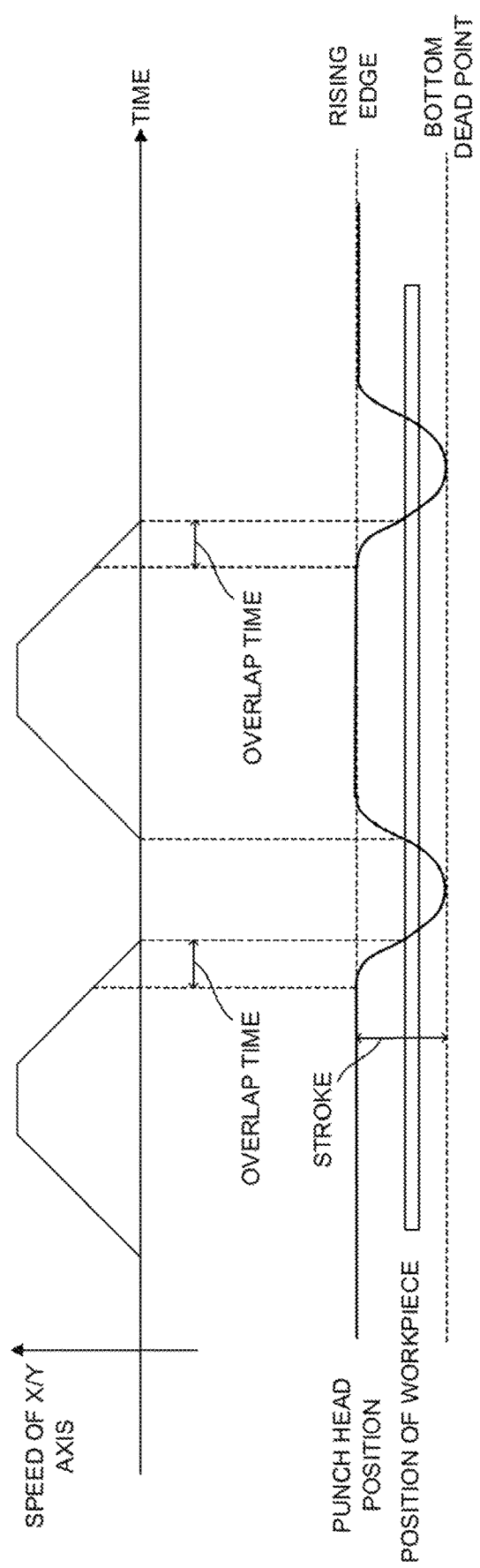

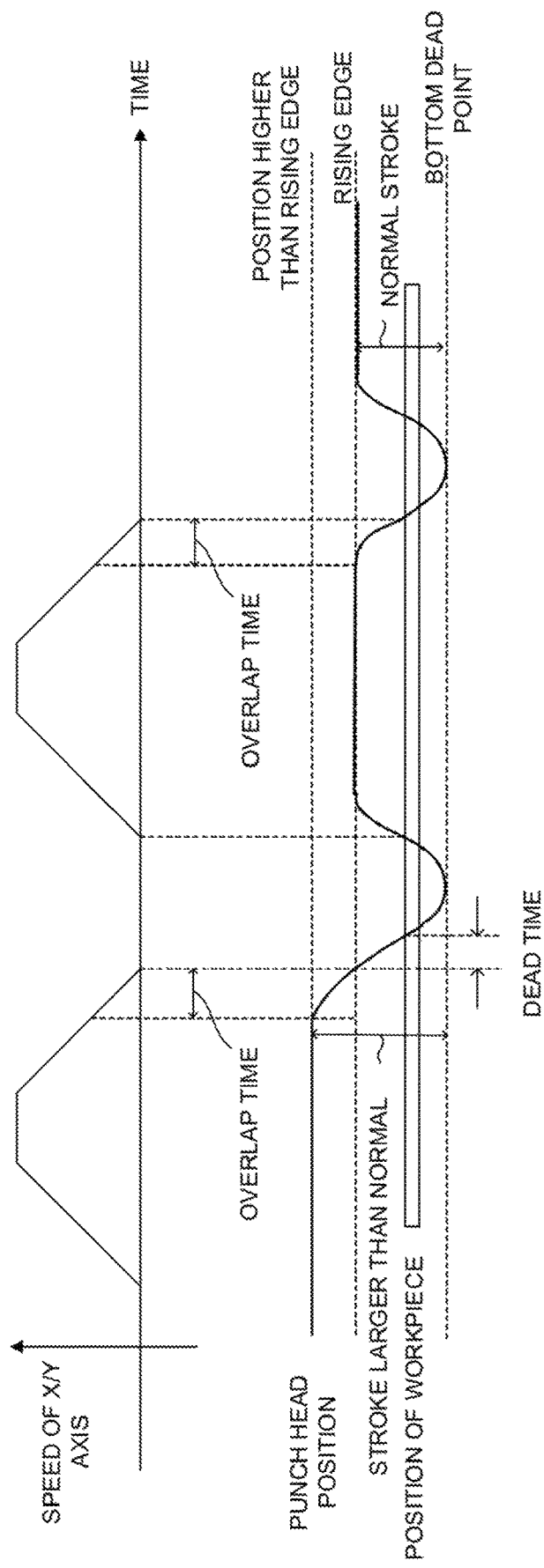

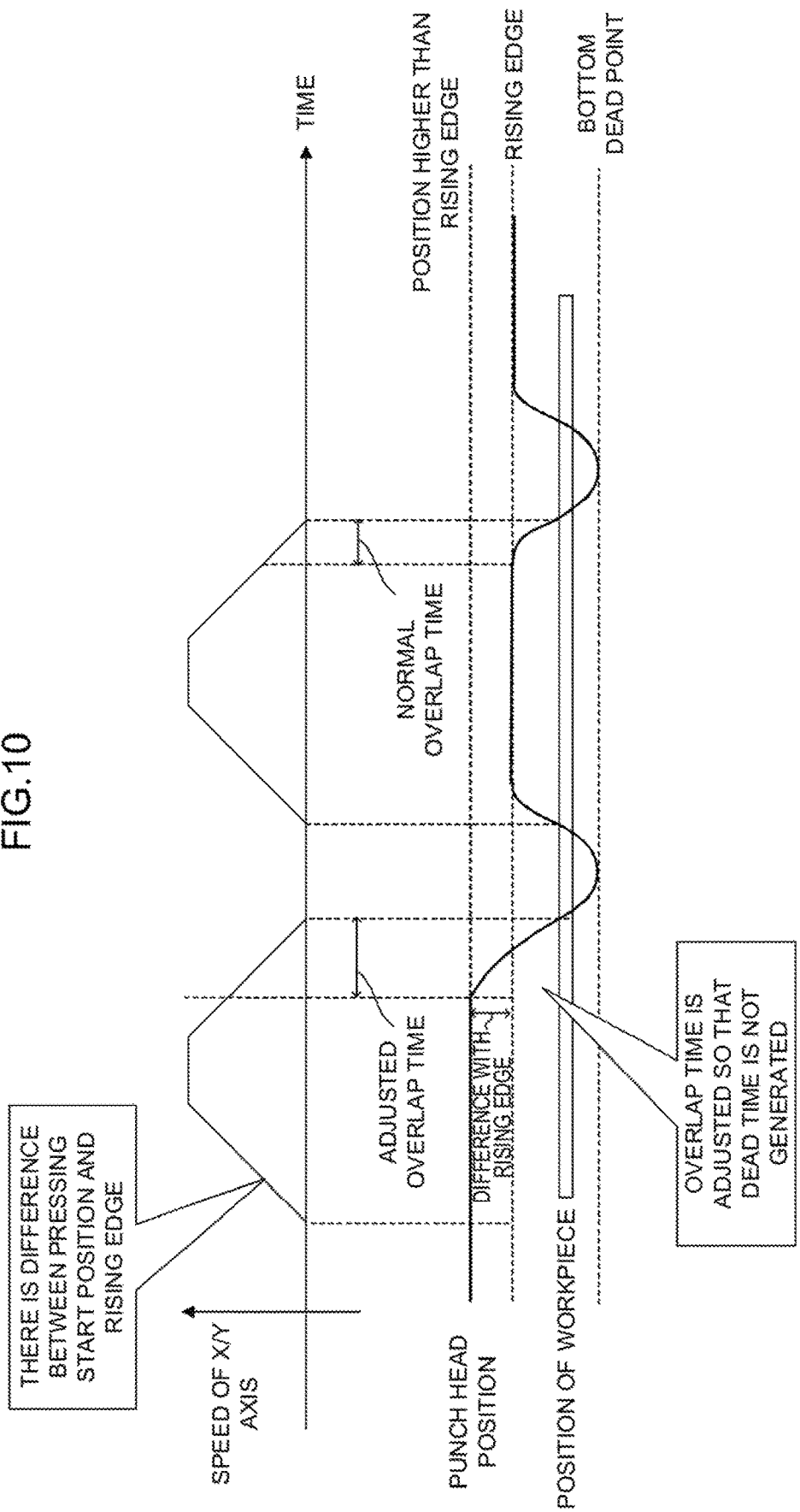

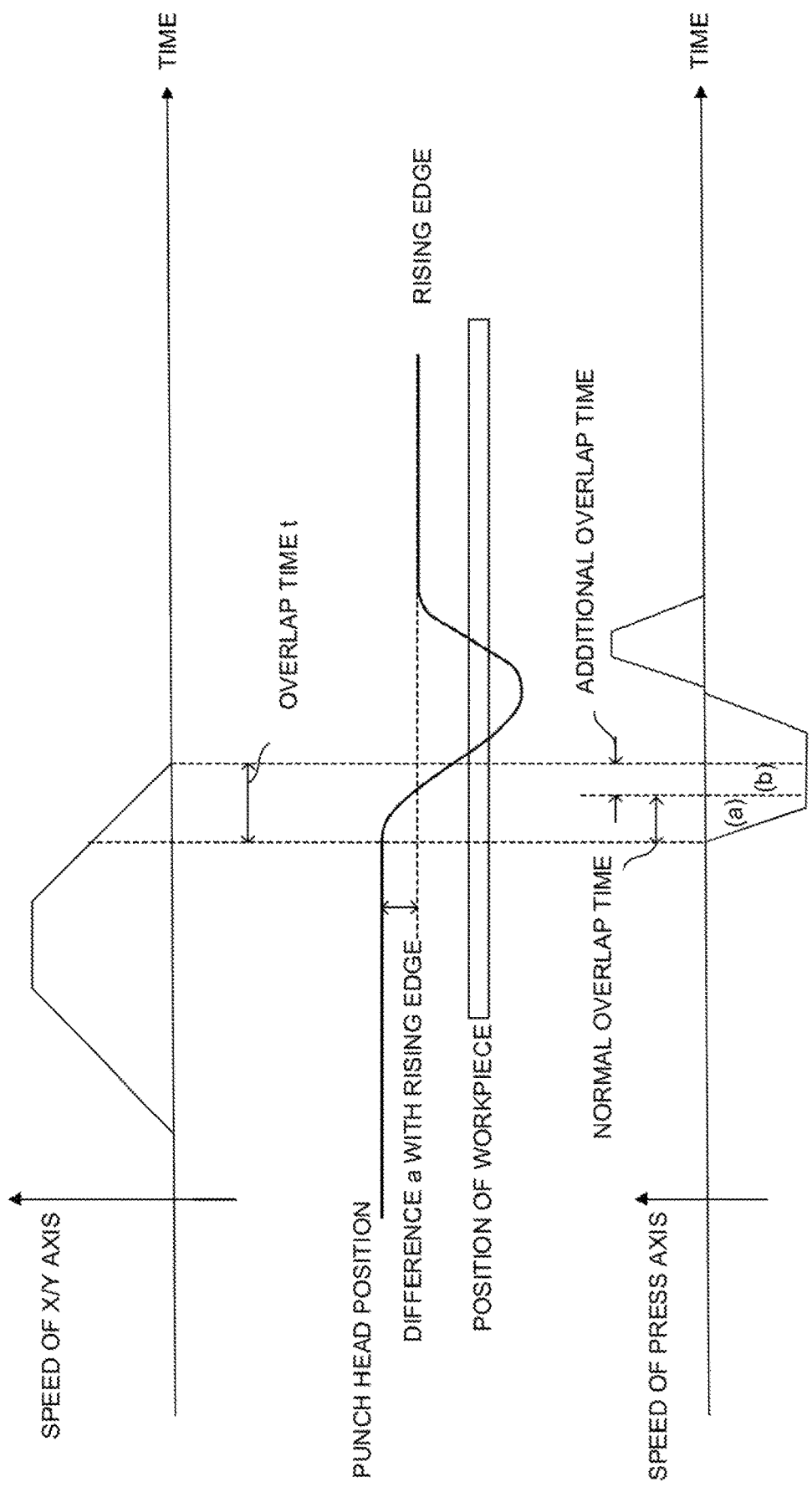

NUMERICAL CONTROLLER

CROSS-REFERENCE TO RELATED APPLICATION

This application is a new U.S. Patent Application that claims benefit of Japanese Patent Application No. 2017-144071, filed Jul. 26, 2017, the disclosure of this application is being incorporated herein by reference in its entirety for all purposes.

BACKGROUND OF THE INVENTION

1. Field of the Invention

The invention relates to a numerical controller, and particularly relates to a numerical controller that automatically adjusts press timing according to a press stroke.

2. Description of the Related Art

In punch press machine tools, a punch point on a workpiece is relatively moved to a position of a punch tool selected by a turret mechanism, etc. in a punch head based on a movement command for an X/Y axis commanded by a program, and then punch press machining is performed by a press operation (punch operation).

As a conventional technology for increasing a speed of punch press machining by a punch press machine tool, there is a technology referred to as a press advancing timer which executes movement of an X/Y axis and a press operation by an overlap time set as a parameter, etc. in overlapping manner and shortens a machining time. In this overlap time, as illustrated in FIG. 8, a residual movement time of the X/Y axis from start of pressing (that is, a time from a press start time from a rising edge until the punch head reaches an upper surface of a workpiece) is set, and adjustment is performed such that the punch tool attached to the punch head comes into contact with the workpiece at timing at which the X/Y axestops. In addition, a stroke of the press operation is set to be as small as possible (rising edge to bottom dead point), and an overlap time corresponding thereto is set (for example, see Japanese Patent Application Laid-Open No. 09-010858).

As described above, in case in which press starts from the rising edge, the time until the punch tool attached to the punch head reaches the upper surface or the workpiece is set as an overlap time. Thus, if press starts at the same timing in a case in which the punch head rises to a higher position than the rising edge immediately after tool exchange or after avoidance of an obstacle, for example, so that the stroke increases, then movement of the punch point to a position of the punch tool on the X/Y axis is completed at a point in time at which the overlap time elapses as illustrated in FIG. 9, and then a problem that the time until the punch tool attached to the punch head touches the workpiece becomes a dead time arises.

SUMMARY OF THE INVENTION

In this regard, an object of the invention is to provide a numerical controller capable of preventing a dead time from being generated even when there is a change in a press stroke.

In the invention, as illustrated in FIG. 10, the above-mentioned problem is solved by providing, to a numerical controller that controls a punch press machine tool, a function of determining whether or not there is a difference between a start position of a press operation and a rising edge when a block of a machining program starts to be executed and automatically adjusting an overlap time such that a dead time is not generated according to a difference with the rising edge. As illustrated in FIG. 11, the overlap time t may be obtained from a movement amount of a press axis (that is, an amount obtained by adding, to a normal overlap amount, a difference between a position of a punch head and a rising edge at the time of starting pressing, in case of FIG. 11). In a graph using a vertical axis of FIG. 11 as a speed of the press axis and a horizontal axis as time, an area of a region (a) represents a movement amount (normal overlap amount) from a rising edge to an upper surface of a workpiece, and an area of a region (b) corresponds to a difference 'a' between the position of the punch head and the rising edge at the time of smarting the press operation. In addition, the numerical controller of the invention has a function of recalculating an improved overlap time when the press axis operates during movement of the X/Y axis.

The numerical controller according to the invention controls, based on a program, a machine tool chat performs punch press machining on a workpiece using a tool attached to a punch head. The numerical controller includes: a command analysis unit that generates movement command data by reading and analyzing a command block from the program, and outputs the generated movement command data; an interpolation unit that performs an interpolation process baaed on the movement command data to generate interpolation data and outputs the generated interpolation data; and an overlap time calculation unit that calculates, in a case in which press operation in the punch press machining is started from a position different from a position of a rising edge set in advance, an overlap time according to the position of the punch head at the time when the press operation is started. And the interpolation unit controls an output timing of interpolation data related to an axis controlling the press operation based on an overlap time calculated by the overlap time calculation unit.

The overlap time calculation unit may be configured to calculate the overlap time such that a dead time is not generated between a timing at which the tool moves to a punch point of the workpiece and a timing at which the tool comes into contact with an upper surface of the workpiece by the press operation.

According to the invention, a dead time may be prevented from being generated even when there is a change in press stroke, and thus it is possible to shorten a cycle time in a case in which tool exchange, avoidance of an obstacle, etc. are performed in punch press machining.

BRIEF DESCRIPTION OF THE DRAWINGS

FIG. 8 is a diagram for description of a press advancing timer according to a conventional technology;

FIG. 9 is a diagram for description of a problem of the press advancing timer according to the conventional technology;

FIG. 10 is a diagram for description of a problem of a press advancing timer according to the embodiments; and FIG. 11 is a diagram for description of a problem of the press advancing timer according to the embodiments.

DETAILED DESCRIPTION OF THE PREFERRED EMBODIMENTS

A configuration example of a numerical controller for implementing the invention will be described below. However, a configuration of the numerical controller of the invention is not limited to the examples below, and any configuration may be adopted as long as an object of the invention can be achieved.

Figure 1:
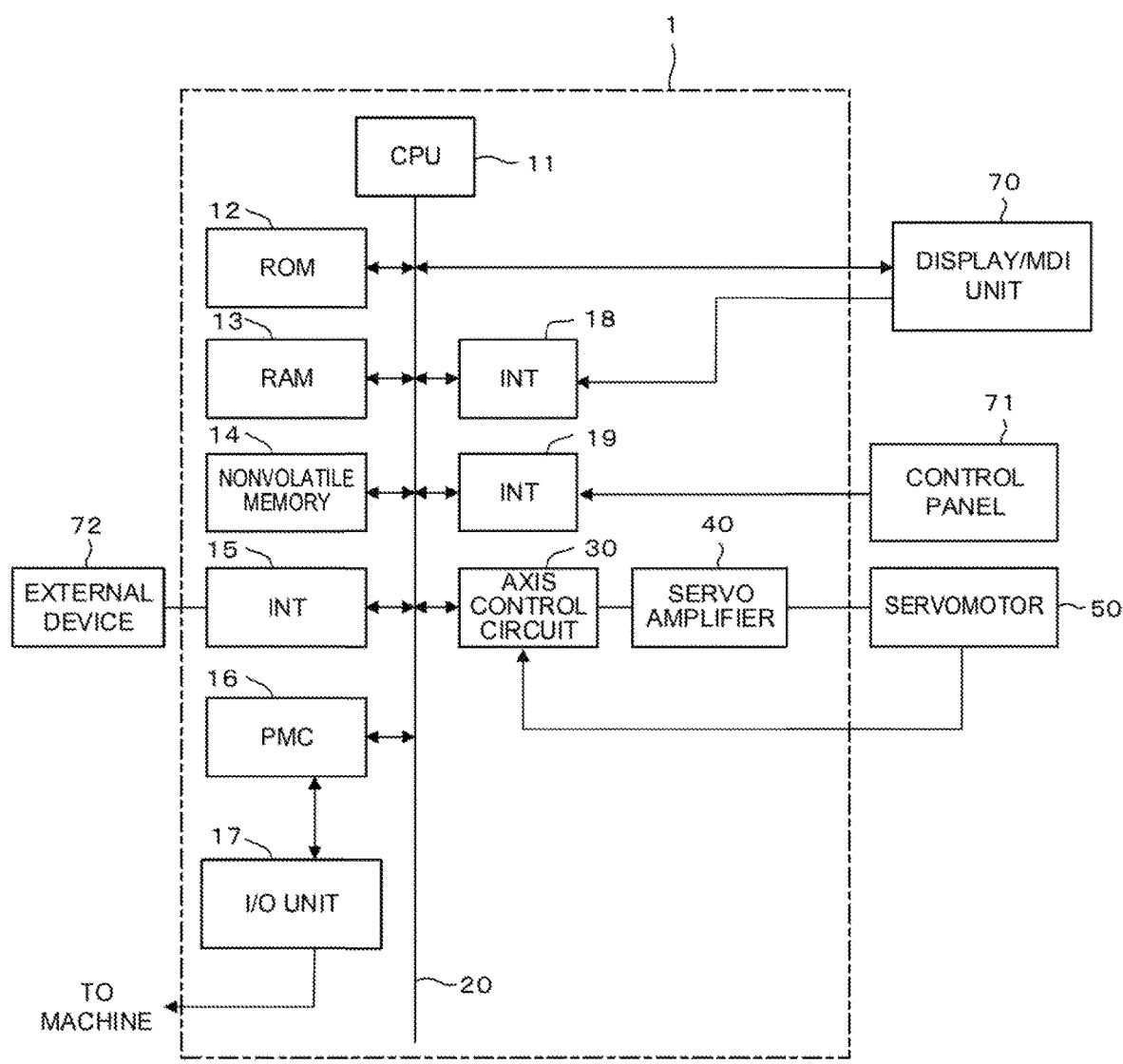
FIG. 1 is a schematic hardware configuration diagram illustrating a main part of a numerical controller according to an embodiment and a machine tool driven and controlled by the numerical controller.

FIG. 1 is a schematic hardware configuration diagram illustrating a main part of a numerical controller according to an embodiment and a machine tool driven and controlled by the numerical controller.

A numerical controller 1 according to the present embodiment includes a central processing unit (CPU) 11. The CPU 11 reads a system program stored in a read only memory (ROM) 12 via a bus 20, and controls the entire numerical controller 1 according to the system program. A random access memory (RAM) 13 stores temporary calculation data, display data, various data input by an operator via a display/manual data input (MDI) unit 70 to be described below, etc.

A nonvolatile memory 14 is configured, for example, as a memory that is kept in a storage state even when a power supply of the numerical controller 1 is turned OFF by being backed up by a battery (not illustrated). In addition to an NC program read via an interface 15 and an NC program input via the display/MDI unit 70 described below, tool data including a recommended value of a cutting condition of a tool used for machining is stored in this nonvolatile memory 14. The nonvolatile memory 14 further stores an NC program operation processing program, etc. used for operating the NC program, and these programs are loaded in the RAM 13 at the time of execution.

In addition, various system programs (including a system program for calculating an overlap time) for executing an editing mode process required for creating and editing an NC program, and other required processes are written to the ROM 12 in advance.

The interlace 15 is an interface for connecting the numerical controller 1 to an external device 72 such as an adapter. An NC program, various parameters, etc. are read from the external device 72. In addition, the NC program edited in the numerical controller 1 can be stored in external storage means via the external device 72. A programmable machine controller (PMC) 16 outputs a signal to a peripheral device of the machine tool (for example, an actuator such as a robot hand for tool exchange) via an input/output (I/O) unit 17 to perform a control operation, based on a sequence program. In addition, the PMC 16 receives signals from various switches, etc. of a control panel provided in a main body of the machine tool, performs necessary signal processing, and then delivers the signals to the CPU 11.

The display/MDI unit 79 is a manual data input device including a display, a keyboard, etc. An interface 18 receives a command or data from the keyboard of the display/MDI unit 70, and delivers the received command or data to the CPU 11. An interface 19 is connected to an operation panel 71 including a manual pulse generator, etc. used for manually driving respective axes.

An axis control circuit 30 for controlling an axis included in the machine tool receives a movement command amount of the axis from the CPU 11 and outputs the command of the axis to a servo amplifier 40. The servo amplifier 40 receives this command and drives a servomotor 50 that moves the axis included in the machine tool. The servomotor 50 of the axis incorporates a position/speed detector and feeds back a position/speed feedback signal from this position/speed detector to the axis control circuit 30, and position/speed feedback control is performed. Only one axis control circuit 30, one servo amplifier 40, and one servomotor 50 are illustrated in the hardware configuration diagram of FIG. 1. However, in practice, axis control circuits 30, servo amplifiers 40 and servomotors 50 of which number corresponds to the number of axes included in a machine tool of each path which serves as a control object are provided. For example, in a punch press machine tool, the axis control circuit 30, the servo amplifier 40 and the servomotor 50 are provided to control each of an X axis and a Y axis which change a relative position in a horizontal direction between the punch head and the workpiece and to control a press axis that performs a press operation (which changes a relative position in a vertical direction between the punch head and the workpiece), respectively.

Figure 2:
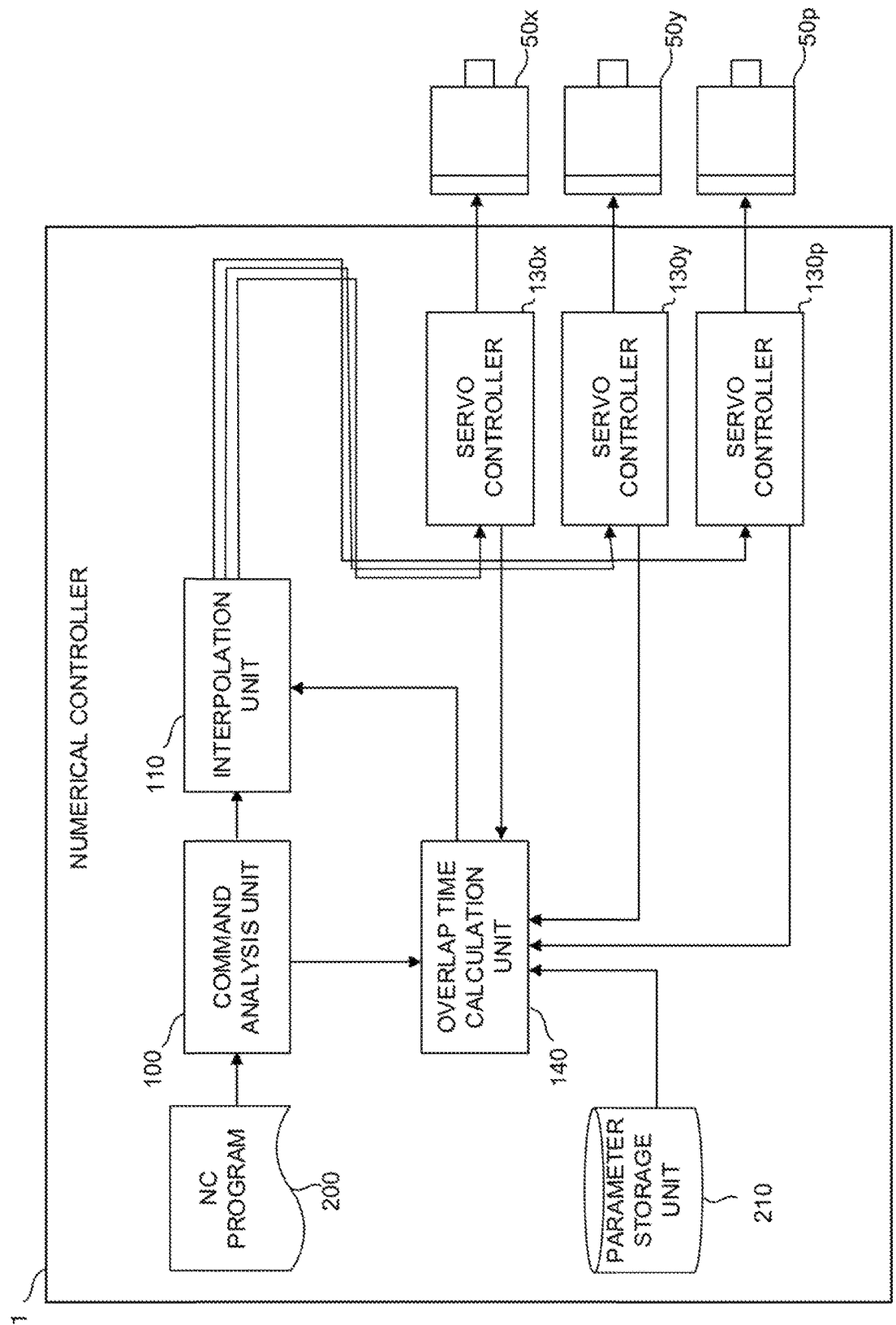
FIG. 2 is a schematic functional block diagram of the numerical controller illustrated in FIG. 1 in which a system program for performing a function related to overlap time calculation is loaded.

FIG. 2 is a schematic functional block diagram illustrating a main part of the numerical controller illustrated in FIG. 1 in which a system program for performing a function related to overlap time calculation is loaded. Each functional block illustrated in FIG. 2 is performed when the CPU 11 included in the numerical controller 1 illustrated in FIG. 1 executes a system program of an overlap time calculation function and controls an operation of each unit of the numerical controller 1.

The numerical controller 1 includes a command analysis unit 100, an interpolation unit 110, servo controllers 130$x$, 130$y$, and 130$p$, and an overlap time calculation unit. Further, a parameter storage unit 210 for storing parameters such as an acceleration/deceleration time constant of each axis, a rising edge used to control a punch press operation, a bottom dead point, etc. is ensured on the nonvolatile memory 14. It is presumed that each parameter used to control the punch press operation stored in the parameter storage unit 210 is set by the operator in advance via the display/MDI unit 70, etc. In FIG. 2, a servomotor 50$x$ is a servomotor driving the X axis, a servomotor 50$y$ is a servomotor driving the Y axis, and a servomotor 50$p$ is a servomotor driving the press axis.

The command analysis unit 100 successively reads command blocks included in an NC program 200 stored in the nonvolatile memory 14, analyses the read command blocks, and creates movement command data for driving an axis to be controlled.

The interpolation unit 110 creates interpolation data obtained by interpolating points on a command path commanded by the movement command data created by the command analysis unit 100 at interpolation internals, and outputs the created interpolation data to the servo controllers 130$x$, 130$y$, and 130$p$. In addition, at the time of creating the movement command data, the interpolation unit 110 receives an overlap time t calculated by the overlap time calculation unit 140 and adjusts a start timing of the press operation (timing at which interpolation data is output to the serve controller 130p).

The servo controllers 130x, 130y, and 130p control the respective servomotors 50x, 50y, and 50p that drive the axes to be controlled based on the interpolation data received from the interpolation unit 110.

When the punch head included in the punch press machine tool is in a state of starting pressing from a position other than the rising edge during execution of the NC program 200, the overlap time calculation unit 140 calculates the overlap time t using a method of calculating the overlap time described below based on a value of each parameter related to the press operation stored in the parameter storage unit 210, each command value analyzed by the command analysis unit 100, positions of the respective axes acquired from the servo controllers 130x, 130y, and 130p, etc. The overlap time t calculated by the overlap time calculation unit 140 is output to the command analysis unit 100. In addition, when detecting that the press axis is operated during movement of the X/Y axis based on the positions of the respective axes acquired from the servo controllers 130x, 130y, and 130p, the overlap time calculation unit 140 recalculates the overlap time t.

Hereinafter, a description will be given of the method of calculating the overlap time t with reference to FIG. 3 to FIG. 6. In FIG. 3 to FIG. 6, an acceleration/deceleration time constant of the press axis is denoted by $\tau$, a command speed is denoted by F, a normal overlap time is denoted by $t_1$, an overlap time that is added when the position of the punch head is above the rising edge is denoted by $t_2$, and a difference between the rising edge and the position of the punch head at the time of starting pressing is denoted by a.

In general, the press axis reaches the command speed F when a time corresponding to the acceleration/deceleration time constant $\tau$ elapses after the start of the press operation. The difference a between the rising edge and the position of the punch head at the time of starting the press operation corresponds to an area of a speed waveform of the press axis indicated by a shaded part illustrated in each of FIG. 3 to FIG. 6. In this instance, the additional overlap time $t_2$ is an operation time corresponding to the area of the shaded part, and the overlap time t equals $t_1+t_2$. On the assumption thereof, calculation of the overlap time t is considered in several cases based on a relationship among the normal overlap time $t_1$, the additional overlap time $t_2$, and the acceleration/deceleration time constant $\tau$.

Figure 3:
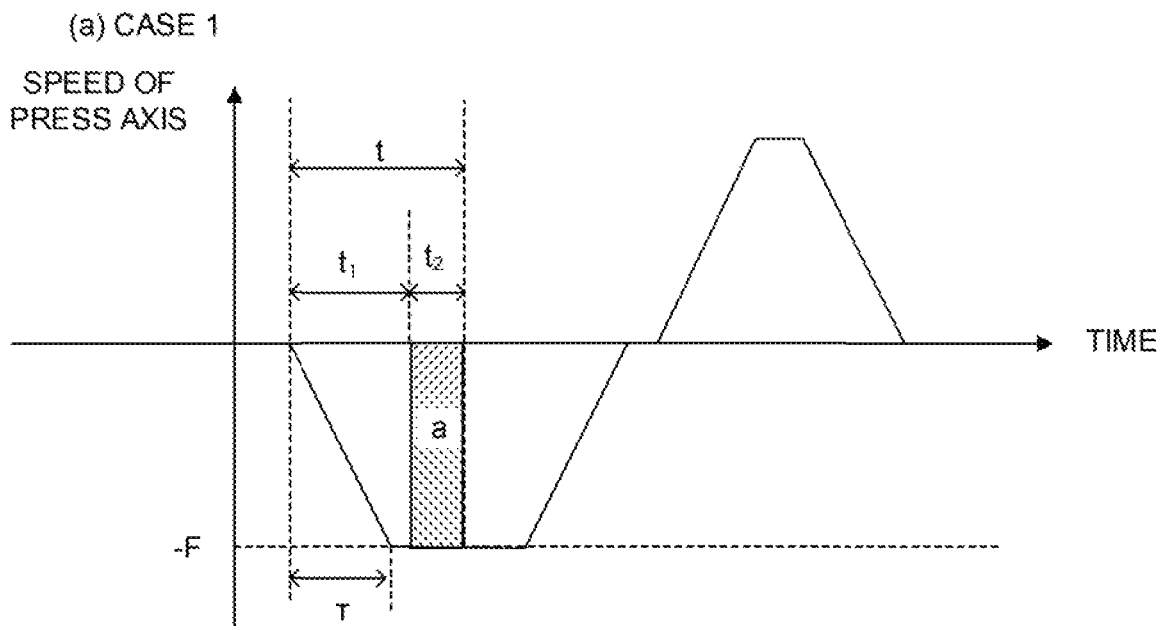
FIG. 3 is a diagram for description of a method (case 1) of calculating an overlap time t according to embodiments.

First, as illustrated in FIG. 3, when the normal overlap time $t_1$ is larger than the acceleration/deceleration time constant $\tau$, the additional overlap time $t_2$ can be expressed by Formula (1) below, and thus the overlap time t ($=t_1+t_2$) can be calculated by Formula (2) below.

$$t_2 = \frac{a}{F} \quad (1)$$

$$t = t_1 + \frac{a}{F} \quad (2)$$

Figure 4:
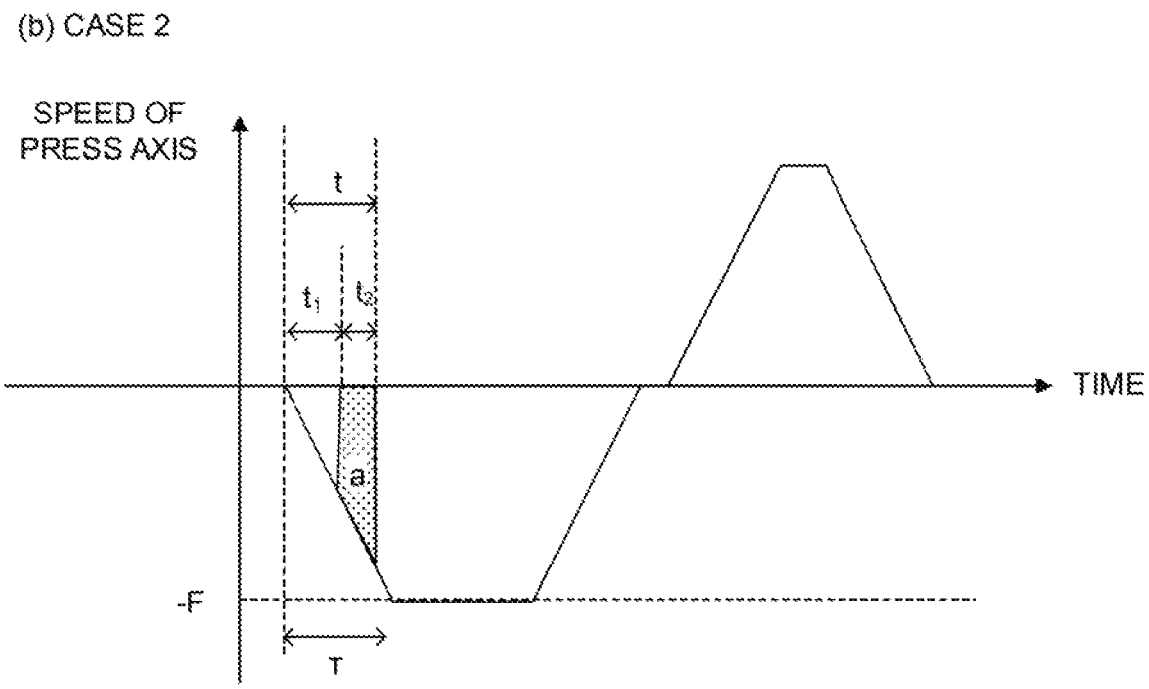
FIG. 4 is a diagram for description of a method (case 2) of calculating the overlap time t according to embodiments.

In addition, as illustrated in FIG. 4, when the overlap time t is smaller than the acceleration/deceleration time constant $\tau$, that is, when a condition shown in Formula (3) below is satisfied, a difference 'a' between the rising edge and the position of the punch head at the time of starting the press operation can be expressed by Formula (4) below, and thus the overlap time t can be calculated by Formula (5) below.

$$a < \frac{F\tau}{2} - \frac{Ft_1^2}{2\tau} \quad (3)$$

$$a = \frac{\left(\frac{F\tau}{t_1+t_2} + \frac{F\tau}{t_1}\right)t_2}{2} \quad (4)$$

$$t = -\frac{at_1}{F\tau} + \sqrt{\left(\frac{at_1}{F\tau}\right)^2 + 1} \quad (5)$$

Figure 5:
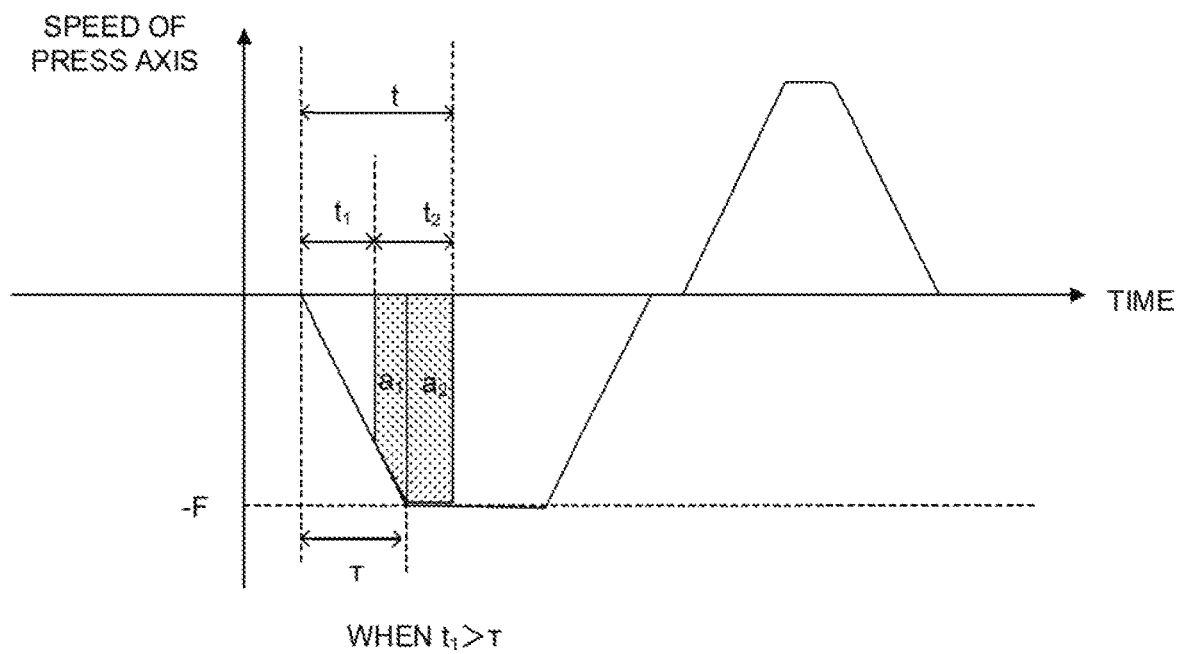
FIG. 5 is a diagram for description of a method (case 3) of calculating the overlap time t according to embodiments.

Further, in a case other than the cases illustrated in FIG. 3 and FIG. 4, the overlap time t can be obtained using Formula (2) and Formula (5). For example, as illustrated in FIG. 5, in a case in which an acceleration is switched before the additional overlap time $t_2$ expires, a sum of overlap times obtained by individually calculating $a_1$ and $a_2$ with $a=a_1+a_2$ is $t_2$.

Figure 6:
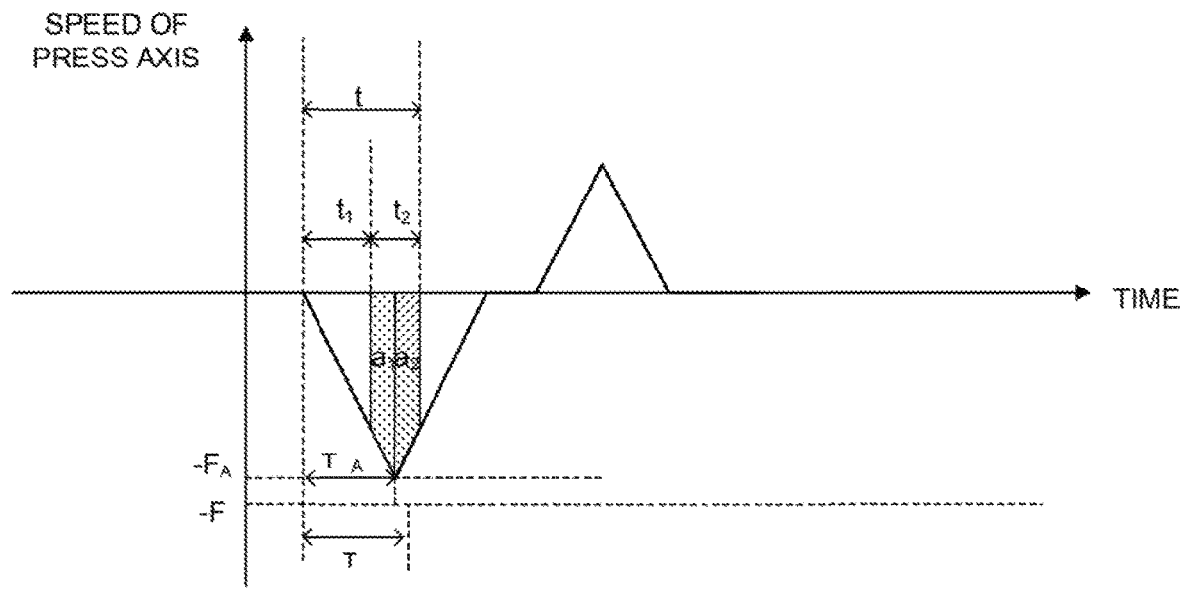
FIG. 6 is a diagram for description of a method (case 4) of calculating the overlap time t according to embodiments.

In addition, for example, as illustrated in FIG. 6, in a case in which a decreasing speed of the punch head does not reach the command speed F, when a movement amount until acceleration of the punch head is switched is denoted by A, a speed reached until acceleration of the punch head is switched is denoted by $F_A$, and a time until acceleration of the punch head is switched is denoted by $\tau_A$, $F_A$ and $\tau_A$ can be expressed by Expression (6) and Expression (7) below, respectively. Thus, a sum of overlap times individually calculated for each of $a_1$ and $a_2$ with $\tau=\tau_A$, $F=F_A$, and $a=a_1+a_2$ is the additional overlap time $t_2$.

$$\tau_A = \frac{2F}{A} \quad (6)$$

$$F_A = \frac{2F^2}{A\tau} \quad (7)$$

Figure 7:
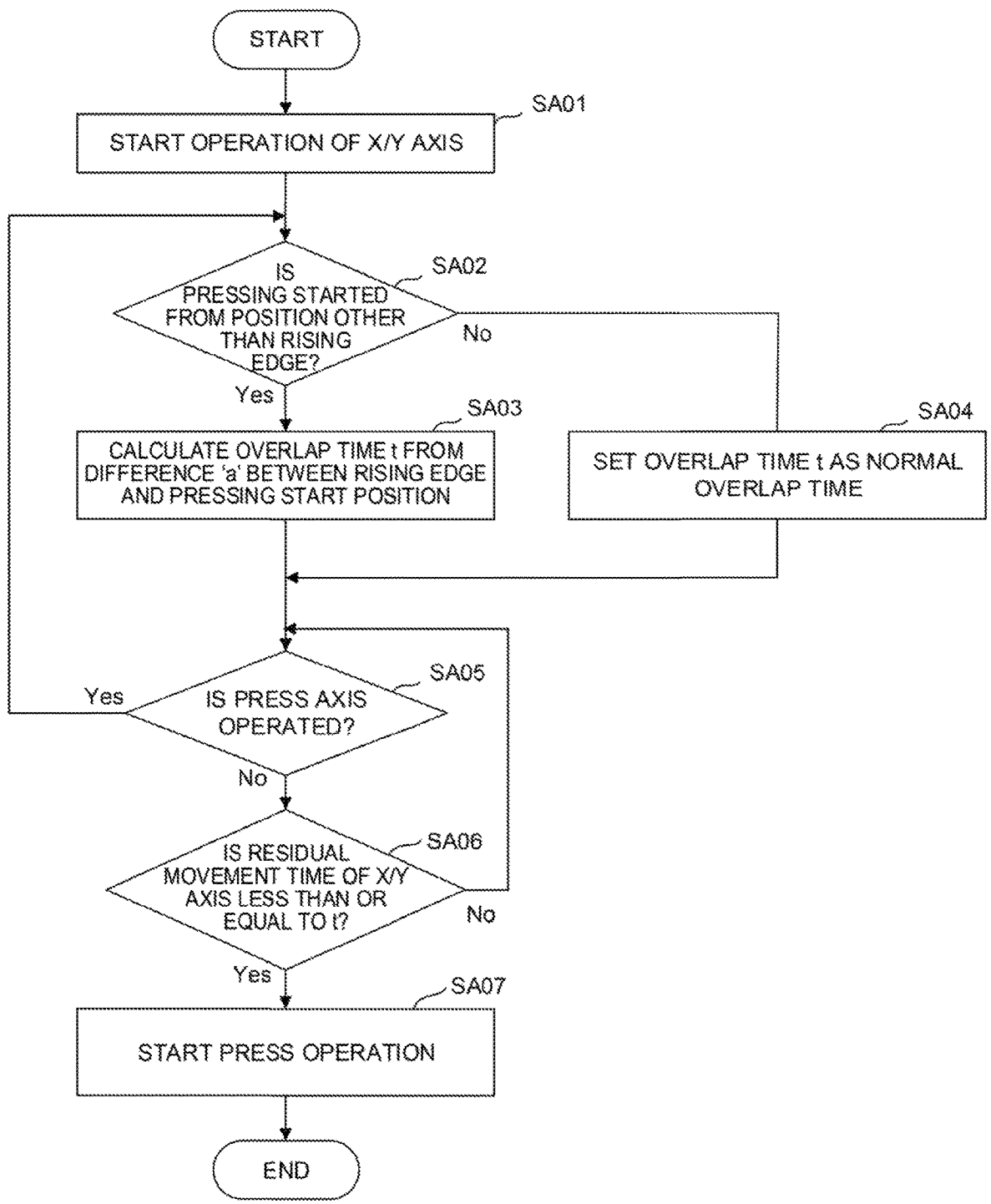
FIG. 7 is a flowchart illustrating an outline of a flow of a process of calculating the overlap time t by the numerical controller of FIG. 2.

FIG. 7 is a flowchart illustrating an outline of a flow of a process executed on the numerical controller 1 related to calculation of an overlap time.

[Step SA01] The numerical controller 1 starts an operation of the X/Y axis based on the movement command data created by the command analysis unit 100.

[Step SA02] The overlap time calculation unit 140 checks a state of the press axis, and determines whether or not the punch head is in a state of starting pressing from a position other than the rising edge. The process proceeds to step SA03 when the punch head is in the state of starting pressing from a position other than the rising edge, and the process proceeds to step SA04 when the punch head is in a state of starting pressing from the rising edge.

[Step SA03] The overlap time calculation unit 140 calculates the overlap time t using the calculating method described with reference to FIG. 3 to FIG. 6 based on the difference 'a' between the rising edge and the pressing start position.

[Step SA04] The overlap time calculation unit 140 sets the overlap time t as a normal overlap time which is set as a parameter.

[Step SA05] The interpolation unit 110 determines whether or not the press axis is in an operating state. The process proceeds to step SA02 when the press axis is in the operating state. Otherwise, the process proceeds to step SA06.

[Step SA06] The interpolation unit 110 determines whether or not the residual movement time of the X/Y axis is less than or equal to the overlap time t calculated in steps SA03 and SA04. The process proceeds to step SA07 when the residual movement time of the X/Y axis is less than or equal to the overlap time t. Otherwise, the process proceeds to step SA05.

[Step SA07] The interpolation unit 110 outputs stored data to the servo controller 130$p$ to start the press operation.

The embodiments have been described above, but the invention is not limited only to the above-described embodiments, and can be implemented in various modes by making appropriate changes.

The invention claimed is:

1. A numerical controller for controlling, based on a program, a machine tool that performs punch press machining on a workpiece using a tool attached to a punch head, the numerical controller comprising:
   a command analysis unit that generates movement command data by reading and analyzing a command block from the program, and outputs the generated movement command data;
   an interpolation unit that performs an interpolation process based on the movement command data to generate interpolation data and outputs the generated interpolation data; and
   an overlap time calculation unit that calculates, in a case in which press operation in the punch press machining is started from a position different from a position of a rising edge set in advance, an overlap time according to the position of the punch head at the time when the press operation is started,
   wherein the interpolation unit controls an output timing of interpolation data related to an axis controlling the press operation based on an overlap time calculated by the overlap time calculation unit.

2. The numerical controller according to claim 1, wherein the overlap time calculation unit is configured to calculate the overlap time such that a dead time is not generated between a timing at which the tool moves to a punch point of the workpiece and a timing at which the tool comes into contact with an upper surface of the workpiece by the press operation.

* * * * *